United States Patent
Pinheiro et al.

(10) Patent No.: US 6,192,628 B1
(45) Date of Patent: Feb. 27, 2001

(54) VEHICLE WINDOW PET BARRIER

(76) Inventors: Elden Pinheiro, 22 The Greenway, Cambridge, Ontario (CA), N1R 6L8; Joe Pinheiro, 40 Dyer Court, Cambridge, Ontario (CA), N3C 4B8

( * ) Notice: Subject to any disclaimer, the term of this patent is extended or adjusted under 35 U.S.C. 154(b) by 0 days.

(21) Appl. No.: 09/368,691

(22) Filed: Aug. 5, 1999

(51) Int. Cl.[7] .................................................. E06B 7/00
(52) U.S. Cl. ................... 49/70; 49/55; 160/105; 160/127; 296/152; 296/370.21; 296/374
(58) Field of Search ........................ 160/104, 105, 160/368.2, 369, 370.21, 372, 374, 374.1, 375, 376, 379, 127, 221; 269/152, 24.2; 105/105.5; 49/55, 57, 50, 70

(56) References Cited

U.S. PATENT DOCUMENTS

| | | | |
|---|---|---|---|
| D. 326,076 | * | 5/1992 | Wiese . |
| 812,654 | * | 2/1906 | Hirsch .................................. 160/379 |
| 953,197 | * | 3/1910 | Fox ........................................... 49/55 |
| 958,481 | * | 5/1910 | Drinkwater .......................... 160/105 |
| 1,459,522 | * | 6/1923 | Woods ................................... 160/221 |
| 2,225,963 | * | 12/1940 | Augustine ............................ 160/105 |
| 2,549,234 | * | 4/1951 | Puffer .................................... 160/105 |
| 2,803,471 | * | 8/1957 | Roth . |
| 3,064,725 | * | 11/1962 | Roark . |
| 3,204,981 | * | 9/1965 | Edwards . |
| 3,847,201 | * | 11/1974 | Kalish . |
| 4,285,383 | * | 8/1981 | Steenburgh .......................... 160/105 |
| 4,509,881 | * | 4/1985 | Welch ................................ 211/105.5 |
| 4,854,364 | * | 8/1989 | Junker . |
| 5,433,259 | * | 7/1995 | Faludy ................................... 160/127 |
| 5,829,388 | * | 11/1998 | Rosso .................................... 160/105 |
| 5,934,349 | * | 8/1999 | Faller ............................... 160/370.21 |

* cited by examiner

Primary Examiner—Blair M. Johnson

(57) ABSTRACT

A new vehicle window pet barrier for blocking an open window of a vehicle to prevent a pet in the vehicle from escaping through the open window. The inventive device includes an open frame defining a central opening. In a preferred embodiment, the open frame further comprises a plurality of elongate cross members extending across the central opening of the frame. A fan for blowing air is coupled to the open frame.

9 Claims, 2 Drawing Sheets

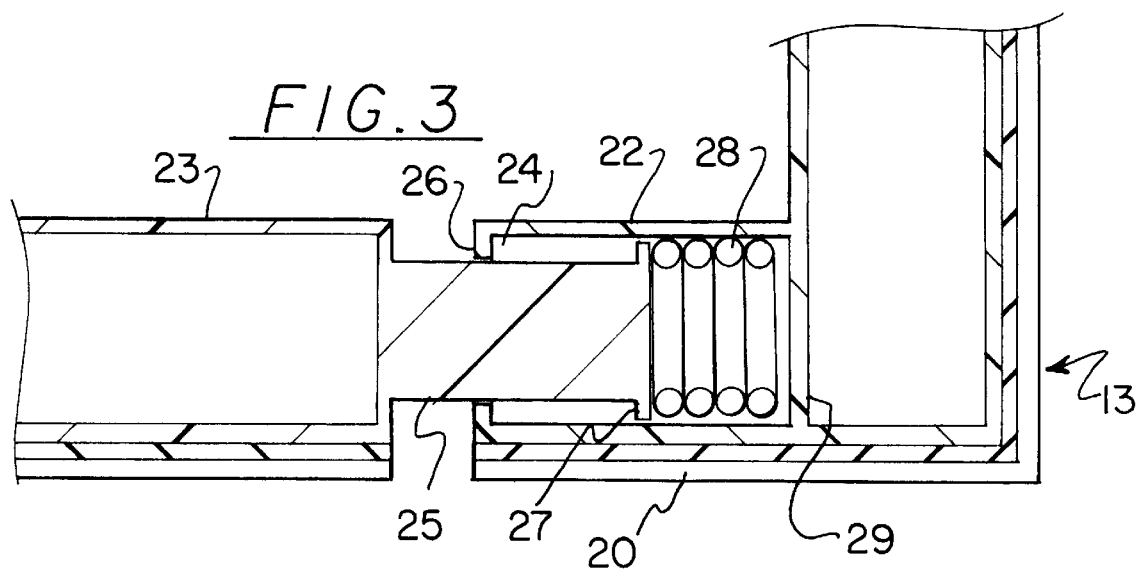
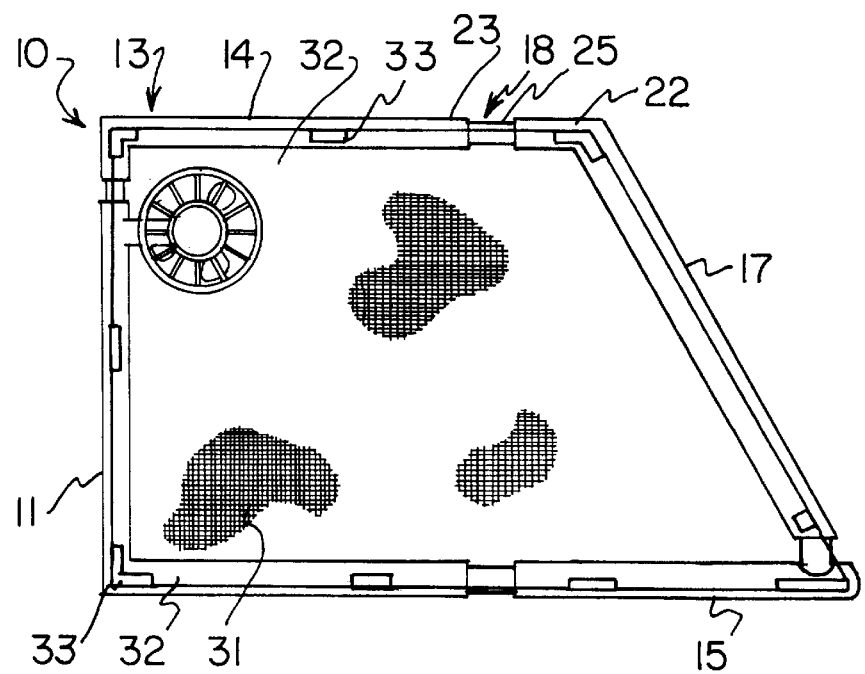

VEHICLE WINDOW PET BARRIER

BACKGROUND OF THE INVENTION

1. Field of the Invention

The present invention relates to vehicle window pet barriers and more particularly pertains to a new vehicle window pet barrier for blocking an open window of a vehicle to prevent a pet in the vehicle from escaping through the open window.

2. Description of the Prior Art

The use of vehicle window pet barriers is known in the prior art. More specifically, vehicle window pet barriers heretofore devised and utilized are known to consist basically of familiar, expected and obvious structural configurations, notwithstanding the myriad of designs encompassed by the crowded prior art which have been developed for the fulfillment of countless objectives and requirements.

Known prior art vehicle window pet barriers include U.S. Pat. No. 4,800,803; U.S. Pat. No. 4,854,364; U.S. Pat. No. Des. 326,076; U.S. Pat. No. 4,653,562; U.S. Pat. No. 5,433,660; and U.S. Pat. No. 5,344,361.

While these devices fulfill their respective, particular objectives and requirements, the aforementioned patents do not disclose a new vehicle window pet barrier. The inventive device includes an open frame defining a central opening. In a preferred embodiment, the open frame further comprises a plurality of elongate cross members extending across the central opening of the frame. A fan for blowing air is coupled to the open frame.

In these respects, the vehicle window pet barrier according to the present invention substantially departs from the conventional concepts and designs of the prior art, and in so doing provides an apparatus primarily developed for the purpose of blocking an open window of a vehicle to prevent a pet in the vehicle from escaping through the open window.

SUMMARY OF THE INVENTION

In view of the foregoing disadvantages inherent in the known types of vehicle window pet barriers now present in the prior art, the present invention provides a new vehicle window pet barrier construction wherein the same can be utilized for blocking an open window of a vehicle to prevent a pet in the vehicle from escaping through the open window.

The general purpose of the present invention, which will be described subsequently in greater detail, is to provide a new vehicle window pet barrier apparatus and method which has many of the advantages of the vehicle window pet barriers mentioned heretofore and many novel features that result in a new vehicle window pet barrier which is not anticipated, rendered obvious, suggested, or even implied by any of the prior art vehicle window pet barriers, either alone or in any combination thereof.

To attain this, the present invention generally comprises an open frame defining a central opening. In a preferred embodiment, the open frame further comprises a plurality of elongate cross members extending across the central opening of the frame. A fan for blowing air is coupled to the open frame.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicle window pet barrier apparatus and method which has many of the advantages of the vehicle window pet barriers mentioned heretofore and many novel features that result in a new vehicle window pet barrier which is not anticipated, rendered obvious, suggested, or even implied by any of the prior art vehicle window pet barriers, either alone or in any combination thereof.

It is another object of the present invention to provide a new vehicle window pet barrier which may be easily and efficiently manufactured and marketed.

It is a further object of the present invention to provide a new vehicle window pet barrier which is of a durable and reliable construction.

An even further object of the present invention is to provide a new vehicle window pet barrier which is susceptible of a low cost of manufacture with regard to both materials and labor, and which accordingly is then susceptible of low prices of sale to the consuming public, thereby making such vehicle window pet barrier economically available to the buying public.

Still yet another object of the present invention is to provide a new vehicle window pet barrier which provides in the apparatuses and methods of the prior art some of the advantages thereof, while simultaneously overcoming some of the disadvantages normally associated therewith.

Still another object of the present invention is to provide a new vehicle window pet barrier for blocking an open window of a vehicle to prevent a pet in the vehicle from escaping through the open window.

Yet another object of the present invention is to provide a new vehicle window pet barrier which includes an open frame defining a central opening. In a preferred embodiment, the open frame further comprises a plurality of elongate cross members extending across the central opening of the frame. A fan for blowing air is coupled to the open frame.

Still yet another object of the present invention is to provide a new vehicle window pet barrier that may be constructed with an adjustable frame to tightly fit in a window of a vehicle.

Even yet another object of the present invention is to provide a new vehicle window pet barrier that allows a user to leave a window of a vehicle open to permit the circulation of air therein to keep a pet therein well ventilated.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic cross sectional view of a member of the open frame taken from line 3—3 of FIG. 1.

FIG. 4 is a schematic interior side view of a screen embodiment of the present invention.

DESCRIPTION OF THE PREFERRED EMBODIMENT

Figure 1:
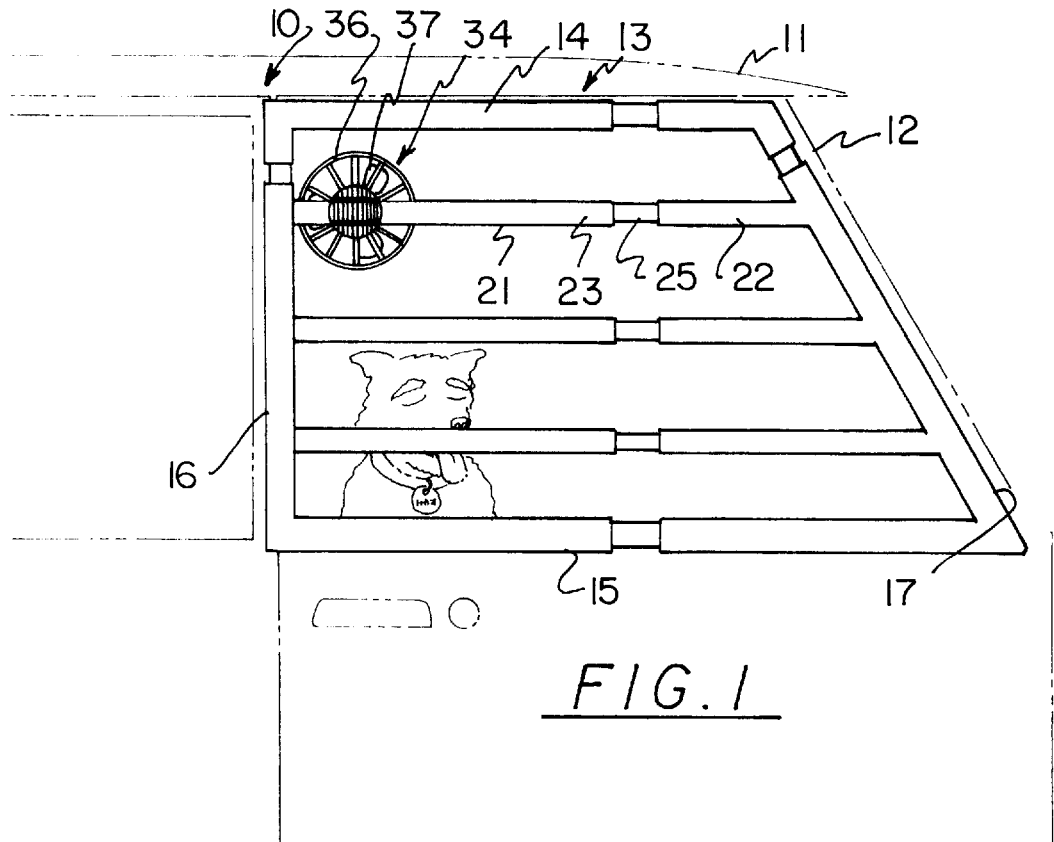
FIG. 1 is a schematic exterior side view of an embodiment of a vehicle window pet barrier in use according to the present invention.

With reference now to the drawings, and in particular to FIGS. 1 through 4 thereof, a new vehicle window pet barrier embodying the principles and concepts of the present invention and generally designated by the reference numeral 10 will be described.

As best illustrated in FIGS. 1 through 4, the vehicle window pet barrier 10 comprises an open frame defining a central opening. In a preferred embodiment, the open frame further comprises a plurality of elongate cross members extending across the central opening of the frame. A fan for blowing air is coupled to the open frame.

In closer detail, the pet barrier 10 is designed for use in a vehicle 11 having a window frame defining an open window 12 of the vehicle. Specifically, a pet barrier comprises an open frame 13 defining a central opening. The open frame includes spaced apart elongate top and bottom members 14,15, and a spaced apart pair of elongate side members 16,17 extending between the top and bottom members of the open frame. The members of the open frame defining interior and exterior faces 18,19 of the open frame. Ideally, each of the members of the open frame is integrally coupled to adjacent members of the open frame.

Figure 2:
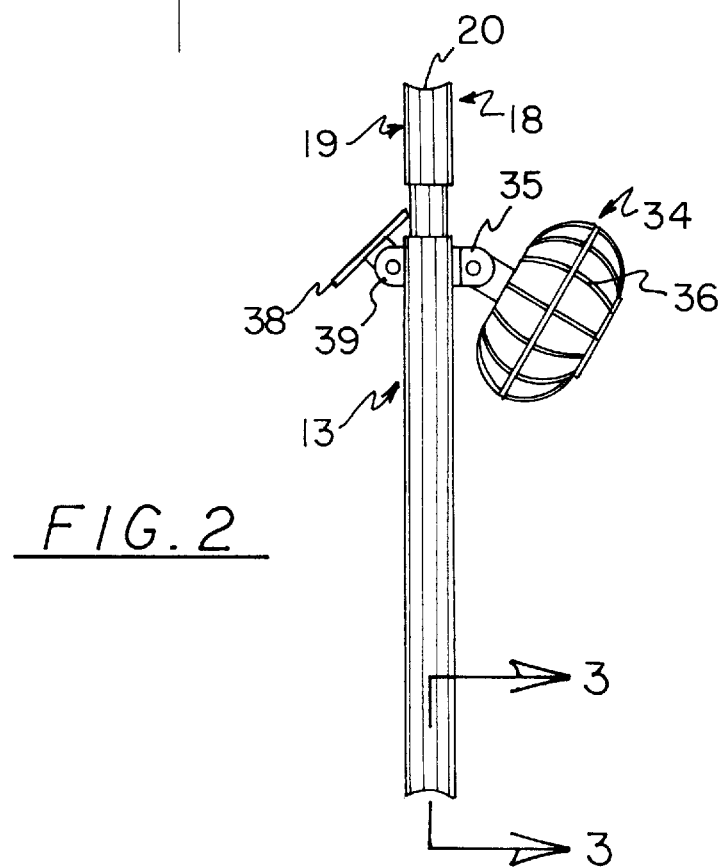
FIG. 2 is a schematic side view of the present invention.

In use, as best shown in FIG. 2, the open frame is designed for positioning in an open window of a vehicle such that the open frame extends along a window frame of the window with the interior face of the open frame facing into the vehicle and the exterior face of the open frame extending away from the vehicle. The open frame should be shaped to fit the shape of the window frame of the window. Typically, the open frame is generally trapezoidal in shape with the top and bottom members extended substantially parallel to one another. Optionally, the open frame may even be generally rectangular with the side members substantially parallel to one another and substantially perpendicular to the top and bottom members to fit rectangular window frames.

With reference to FIG. 2, the open frame has an elongate channel 20 around an outer periphery of the open frame formed by the top, bottom, and side members. The channel has an arcuate transverse cross section with an outwardly facing concavity. The channel is designed for receiving a portion of the window frame therein to help securely hold the open frame in the open window of the vehicle.

As best shown in FIG. 1, in one preferred embodiment, the open frame further includes a plurality of elongate cross members positioned in the central opening of the open frame and extending between the side members of the open frame. The cross members of the open frame are preferably extended substantially parallel to one another and to the top and bottom members of the open frame. The cross members of the open frame are also preferably spaced apart at substantially equal intervals between the top and bottom members of the open frame. Preferably the interval is between about 1 inch and about 8 inches to prevent pets from passing through the open frame. Ideally, the interval is between about 1 inch and about 3 inches to further prevent people from sticking their hands through the open frame and removing objects from inside the vehicle.

In an even more preferred embodiment, each of the members of the open frame (including the top, bottom, side and cross members) comprises a pair of separate portions 22,23 slidably mounted to one another. With particular reference to FIG. 3, a first of the portions 22 of each member of the open frame has an opening 24 telescopically receiving therein an extent 25 extending from a second of the portions 23 of the respective member such that the second portions are telescopically extendable from the associated first portions.

Preferably, the first portions of the members each have an inwardly radiating annular flange 26 around the opening of the respective first portion. In such a preferred embodiment, the extents of the second portions of the members each have an outwardly radiating annular stop 27 disposed in the associated first portion of the respective member, the stop cooperating with the flange to prevent the extent from sliding completely out of the opening of the first portion.

The first portions of the members each have a coiled compression spring 28 disposed therein between the stop of the extent of the associated second portion and a wall 29 disposed in the respective first portion to bias the associated second portion away from the opening of the respective first portion. This spring assembly is designed for spreading the members of the open frame apart until they jam against adjacent portions of the window frame of the window of the vehicle so that the open frame is held securely in place in the window.

Ideally, the open frame has an resiliently deformable outer coating 30 such as a resiliently deformable plastic or rubber coating on the top, bottom, side and cross members to protect the window frame from scratches and other contact with the open frame.

FIG. 4 illustrates another preferred embodiment, of the pet barrier. In this embodiment, a flexible wire mesh screen 31 (such as a mesh fly screen) substantially covers the central opening of the open frame. The screen has a plurality of apertures therethrough of a predetermined size to prohibit a pet or insect from passing through the central opening while still permitting air to flow through the central opening.

The screen has an outer perimeter 32 corresponding to the shape of the open frame such that the outer perimeter of the screen is extended along the top, bottom and side members the open frame adjacent the interior face of the open frame. The outer perimeter of the screen is coupled to the interior face of the open frame preferably by a plurality of spaced apart fasteners 33. Ideally, the fasteners comprise detachable fasteners such as hook and loop fasteners to permit re-attachable detachment of the outer perimeter of the screen to the open frame.

A fan for blowing air is coupled to the interior face of the open frame. Preferably, the fan is pivotally coupled to the interior face of the open frame ideally by a universal pivot coupling 35 to permit adjustable positioning of the fan. In the embodiment illustrated in FIG. 1, the fan is coupled to one of the cross members of the open frame. In the embodiment illustrated in FIG. 4, the fan is mounted to a mounting extent 36 extending from one of the side members of the open frame. Preferably, the fan has a protective cage 37 around the rotatable blades 38 of the fan to prevent a pet in the vehicle from injury by contact with the blades.

A solar panel 38 is preferably coupled to the exterior face of the open frame. The solar panel is preferably pivotally coupled to the exterior face of the panel ideally by a universal pivot coupling 39 to permit adjustable positioning of the solar panel. The solar panel may be coupled to a cross member of the open frame in the cross member embodiment or may be coupled to directly to a side member of the frame, especially in the screen embodiment. The solar panel comprises a plurality of photovoltaic cells electrically connected to the fan for converting radiant light energy into electrical energy to operate the fan.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A pet barrier for mounting in an open window of a vehicle, said pet barrier comprising:
   an open frame defining a central opening;
   said open frame being adapted for mounting in an open window of a vehicle;
   said open frame further comprising a plurality of elongate cross members extending across said central opening of said frame;
   a fan for blowing air being coupled to said open frame;
   a solar panel being pivotally coupled to said exterior face of said open frame in an orientation with respect to sun light for maximizing sun light striking said solar panel; and
   said solar panel comprising a plurality of photovoltaic cells electrically connected to said fan.

2. The pet barrier of claim 1, wherein said open frame further comprises spaced apart elongate top and bottom members, and a spaced apart pair of elongate side members extending between said top and bottom members of said open frame.

3. The pet barrier of claim 2, wherein each of said members of said open frame comprises a pair of separate portions slidably mounted to one another, a first of said portions of each member of said open frame having an opening telescopically receiving therein an extent extending from a second of said portions of the respective member such that said second portions are telescopically extendable from the associated first portions.

4. The pet barrier of claim 3, wherein said first portions of said members each have an inwardly radiating annular flange around said opening of the respective first portion, wherein said extents of said second portions of said members each have an outwardly radiating annular stop disposed in the associated first portion of the respective member.

5. The pet barrier of claim 3, wherein said first portions of said members each have a spring disposed therein between said extent of the associated second portion and a wall disposed in the respective first portion to bias the associated second portion away from said opening of the respective first portion.

6. The pet barrier of claim 1, wherein said open frame has an elongate channel around an outer periphery of said open frame, said channel being adapted for receiving a portion of said window frame therein to hold said open frame in said open window of said vehicle.

7. The pet barrier of claim 1, wherein said open frame has an resiliently deformable outer coating.

8. A pet barrier system, comprising:
   a vehicle having a window frame defining an open window of the vehicle;
   a pet barrier, comprising:
   an open frame defining a central opening and comprising spaced apart elongate top and bottom members, and a spaced apart pair of elongate side members extending between said top and bottom members of said open frame, said open frame having interior and exterior faces;
   each of said members of said open frame being integrally coupled to adjacent members of said open frame;
   said open frame being adapted for positioning in an open window of a vehicle such that said open frame extends along a window frame of the window with said interior face of said open frame facing into the vehicle and said exterior face of said open frame extending away from the vehicle;
   said open frame being shaped to fit the shape of the window frame of the window; said open frame being generally trapezodial in shape with said top and bottom members extended substantially parallel to one another;
   said open frame being positioned in said open window of said vehicle such that said open frame extends along the window frame with the interior face of the open frame facing into the vehicle and the exterior face of the open frame extending away from the vehicle;
   said open frame having an elongate channel around an outer periphery of said open frame, said channel having an arcuate transverse cross section with an outwardly facing concavity;
   said channel receiving therein a portion of said window frame therein to hold said open frame in said open window of said vehicle;

said open frame further comprising a plurality of elongate cross members extending between said side members of said open frame;

said cross members of said open frame being extended substantially parallel to one another and to said top and bottom members of said open frame;

said cross members of said open frame being spaced apart at substantially equal intervals between said top and bottom members of said open frame;

wherein said interval is between about 1 inch and about 8 inches to prevent pets from passing through said open frame;

each of said members of said open frame comprising a pair of separate portions slidably mounted to one another;

a first of said portions of each member of said open frame having an opening telescopically receiving therein an extent extending from a second of said portions of the respective member such that said second portions are telescopically extendable from the associated first portions;

said first portions of said members each having an inwardly radiating annular flange around said opening of the respective first portion;

said extents of said second portions of said members each having an outwardly radiating annular stop disposed in the associated first portion of the respective member, said stop cooperating with said flange to prevent said extent from sliding completely out of said opening of said first portion;

said first portions of said members each having a coiled compression spring disposed therein between said stop of said extent of the associated second portion and a wall disposed in the respective first portion to bias the associated second portion away from said opening of the respective first portion;

said spring assembly being adapted for spreading said members of said open frame apart until said members jam against adjacent portions of the window frame of the window of the vehicle so that said open frame is held securely in place in the window;

wherein said open frame has an resiliently deformable outer coating over said top, bottom, side and cross members to protect the window frame from scratches and other contact with said open frame;

a fan for blowing air being pivotally coupled to said interior face of said open frame;

a solar panel being pivotally coupled to said exterior face of said open frame such that said solar panel may be positioned in an orientation with respect to sun light for maximizing sun light striking said solar panel; and said solar panel comprising a plurality of photovoltaic cells electrically connected to said fan.

9. A pet barrier, comprising:

an open frame defining a central opening and comprising spaced apart elongate top and bottom members, and a spaced apart pair of elongate side members extending between said top and bottom members of said open frame, said open frame having interior and exterior faces;

said open frame having an elongate channel around an outer periphery of said open frame, said channel having an arcuate transverse cross section with an outwardly facing concavity;

each of said members of said open frame comprising a pair of separate portions slidably mounted to one another;

a first of said portions of each member of said open frame having an opening telescopically receiving therein an extent extending from a second of said portions of the respective member such that said second portions are telescopically extendable from the associated first portions;

said first portions of said members each having an inwardly radiating annular flange around said opening of the respective first portion;

said extents of said second portions of said members each having an outwardly radiating annular stop disposed in the associated first portion of the respective member;

said first portions of said members each having a spring disposed therein between said stop of said extent of the associated second portion and a wall disposed in the respective first portion to bias the associated second portion away from said opening of the respective first portion;

wherein said open frame has an resiliently deformable outer coating;

a flexible screen substantially covering said central opening of said open frame, said screen having a plurality of apertures therethrough;

said screen having an outer perimeter corresponding to the shape of said open frame such that said outer perimeter of said screen is extended along said top, bottom and side members said open frame adjacent said interior face of said open frame;

said outer perimeter of said screen being coupled to said interior face of said open frame;

a fan for blowing air;

a mounting extent being extended from one of said side members of said open frame, said fan being coupled to said mounting extent, said mounting extent being extended substantially perpendicular from the associated side member of said open frame;

a solar panel being pivotally coupled to said exterior face of said open frame such that said solar panel may be positioned in an orientation with respect to sun light for maximizing sun light striking said solar panel; and said solar panel comprising a plurality of photovoltaic cells electrically connected to said fan.

* * * * *